(12) United States Patent
Hill et al.

(10) Patent No.: US 6,397,206 B1
(45) Date of Patent: May 28, 2002

(54) OPTIMIZING FIXED, STATIC QUERY OR SERVICE SELECTION AND EXECUTION BASED ON WORKING SET HINTS AND QUERY SIGNATURES

(75) Inventors: Justin H. Hill, Durham; Timo J. Salo, Apex, both of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/461,954

(22) Filed: Dec. 15, 1999

(51) Int. Cl.[7] .............................................. G06F 17/30
(52) U.S. Cl. ........................ 707/2; 707/3; 707/4; 707/5
(58) Field of Search ................................. 707/2, 3, 4, 5

(56) References Cited

U.S. PATENT DOCUMENTS

| | | | | |
|---|---|---|---|---|
| 5,463,772 A | * | 10/1995 | Thompson et al. | 707/100 |
| 5,493,668 A | * | 2/1996 | Elko et al. | 707/200 |
| 5,499,367 A | * | 3/1996 | Bamford et al. | 707/9 |
| 5,537,574 A | * | 7/1996 | Elko et al. | 707/8 |
| 5,544,345 A | * | 8/1996 | Carpenter et al. | 707/203 |
| 5,555,388 A | * | 9/1996 | Shaughnessy | 707/200 |
| 5,557,791 A | * | 9/1996 | Cheng et al. | 707/7 |
| 5,574,902 A | * | 11/1996 | Josten et al. | 707/1 |
| 5,666,525 A | * | 9/1997 | Ross | 707/2 |
| 5,671,403 A | * | 9/1997 | Shekita et al. | 707/2 |
| 5,812,996 A | * | 9/1998 | Rubin et al. | 707/2 |
| 5,822,749 A | * | 10/1998 | Agrawal | 707/2 |
| 5,864,840 A | | 1/1999 | Leung et al. | 707/2 |
| 6,278,899 B1 | * | 8/2001 | Piche et al. | 700/44 |

* cited by examiner

Primary Examiner—Frantz Coby
(74) Attorney, Agent, or Firm—Gregory M. Doudnikoff; Marcia L. Doubet

(57) ABSTRACT

A technique for using working set hints and query signatures to optimize the selection and execution of fixed, static services or queries of information from a database, object server, or similar data repository. The working set hints describe how to read ahead when doing a database query, in order to retrieve data in a single database access that a task is likely to need as it continues executing. By storing the working set hints externally from the application code, the hints can be modified as experience is gained about the true working set that is required during use of each task without having to modify and recompile the application itself. Signatures are created and associated with query commands or services. These signatures are compared to the working set hints for a task when the task traverses an association and needs to retrieve data from the data repository. The signature which best matches the task's working set hints is automatically selected, and the query or service associated with this signature is then executed, providing an optimized database retrieval operation.

12 Claims, 14 Drawing Sheets

| 300 | Employee Number 305 | Employee Name 306 | Department Number 307 | Project Number 308 |
|---|---|---|---|---|
| 301 | 00010 | Jane Doe | D01 | AD3100 |
| 302 | 00050 | John Doe | D01 | MA2100 |
| 303 | 00100 | John Q Public | E01 | OP2010 |
| 304 | 00320 | Mary Doe | D01 | MA2100 |

Figure 3A
Employee table

| 330 | Department Number 335 | Manager Number 336 | Department Name 337 |
|---|---|---|---|
| 331 | D01 | 00010 | Development |
| | E01 | 00010 | Administration |
| | E21 | 00320 | Support |
| | E31 | 00070 | Operations |

Figure 3B
Department table

| 360 | Project Number 365 | Project Name 366 |
|---|---|---|
| 361 | AD3100 | Admin Serv |
| 362 | MA2100 | Weld Line A |
| | OP2000 | Gen Sys Ser |
| | OP2010 | Sys Support |

Figure 3C
Project table

400

| Task ID 410 | Finder Name 420 | Working Set Hint 430 |
|---|---|---|
| 411 Dept-mgr-emp-proj | 421 EmplFindByDept | 431 Department.(mgr & (emp.proj)) 435 436 437 438 439 432 433 434 |
| 412 Display-employees | 422 ProjFindByEmpl 423 MgrFindByEmpl | 441 Employee.proj 442 Employee.mgr |

| Query 510 | Query Signature 520 |
|---|---|
| 511 SELECT ... FROM Department, Manager WHERE Manager.DeptNo=Department.DeptNo UNION SELECT ... FROM Department, Employee, Project WHERE Employee.DeptNo= Department.DeptNo AND Employee.ProjNo = Project.ProjNo | 521 Department . (mgr & (emp . proj)) 522 523 525 527 524 526 528 |
| 531 SELECT * FROM Employee, Project WHERE Employee.EmplNo = empl_no AND Employee.ProjNo = Project.ProjNo | 541 Employee.proj |

Fig. 5

| D01 | 00010 | Development | 00010 | Jane Doe | D01 | AD3100 | AD3100 | Admin Serv |
| D01 | 00010 | Development | 00050 | John Doe | D01 | MA2100 | MA2100 | Weld Line |
| D01 | 00010 | Development | 00320 | Mary Doe | D01 | MA2100 | MA2100 | Weld Line |

600

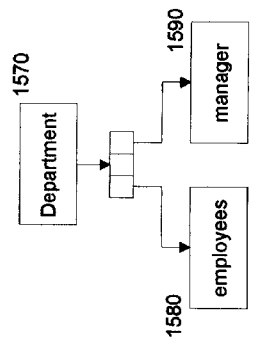
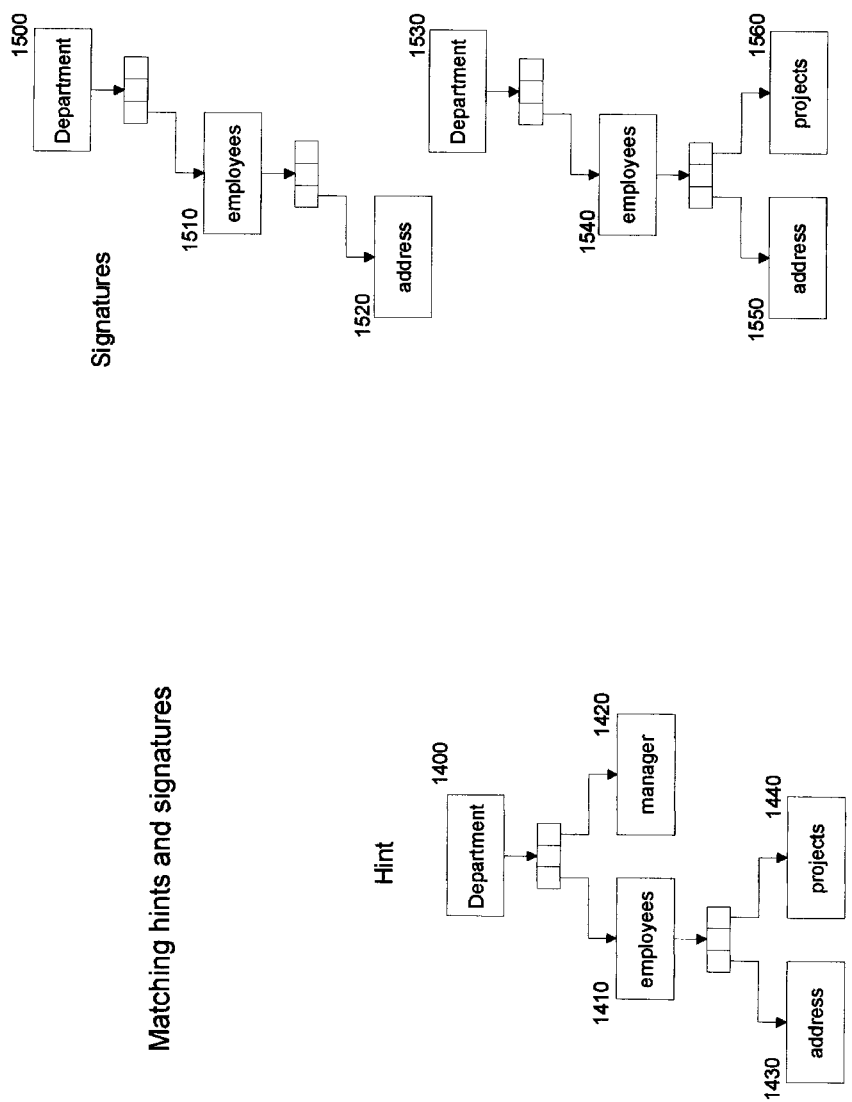
Fig. 15
Matching hints and signatures
Fig. 14

OPTIMIZING FIXED, STATIC QUERY OR SERVICE SELECTION AND EXECUTION BASED ON WORKING SET HINTS AND QUERY SIGNATURES

BACKGROUND OF THE INVENTION

1. Field of the Invention

The present invention relates to the field of computer programming, and more particularly to a method, system, and computer program product for using working set hints and query signatures to optimize the selection and execution of fixed, static queries or services which are used to retrieve information from a database, object server, or similar data repository.

2. Description of the Related Art

Various caching and read-ahead strategies can dramatically improve the efficiency and flexibility of an executing application program. Caching is a technique known in the computer programming art for increasing the speed of data retrieval. It involves storing data in an easily-accessible location from which it can be quickly retrieved. Read-ahead is another technique known in the art, whereby a prediction is made as to which data will be needed by a software application: that data is then retrieved in advance. When the prediction has been accurately made, the data will be available at the time the application needs it and the application will not have to wait while a retrieval operation takes place. Typically, the data that is read ahead is the "working set", where a working set is the set of data that the application is using at a point in time (or is expected to need to use, in the case of read-ahead).

In object-oriented programming, the working set is the set of objects the application is using. An application typically consists of multiple tasks, and each task may have its own working set. For example, suppose an application uses Employee objects as well as Department objects and Project objects for those employees. An employee may change from one department to another, necessitating a change to his existing stored data. To perform this change-department task, a user of the application will typically cause the application to retrieve the employee object for this employee, and then retrieve the employee's department object. The working set for this task therefore comprises objects from the Employee and Department classes. Suppose an employee may be assigned to work on zero or more projects at any given time, and a manager wishes to obtain a list of all the projects to which his employees are assigned. This project-inquiry task involves retrieving each employee object and zero or more project objects for each one, but would not likely require any department objects to be accessed. Thus, for this task, the working set comprises objects from the Employee and Project classes.

When objects are persisted using a relational database, the various classes of objects typically correspond to separate tables in the database. For the example application discussed above, the database would contain tables for Employee, Department, and Project data. Each employee then has a row in the Employee table, and is associated with a row in the Department table (assuming each employee is assigned to a single department) and zero or more rows in the Project table. The application retrieves data from these tables by issuing a database query. It may take a considerable amount of time, relative to the overall processing time of a task, to complete a database query operation. The query operation involves multiple components of the computer system. After the application issues the query, the operating system may be involved, after which the database system receives the query (and possibly reformats it), locates the requested rows from the table or tables, formats the rows into a message to be returned to the application, and contacts the operating system with this result message. The message is then received by the requesting application, which can then begin to process the data. When the database is remotely located, such as in a network computing environment, the time required to complete the query is increased by the time required for the communication over the network to occur between the client machine and the database server (including the possibility of communications over intermediate connections between the client and database server). Thus, it can be seen that issuing a database query is an expensive operation in terms of elapsed time.

When a client machine and database server are connected in a local-area network (LAN) environment, it has been demonstrated that the amount of data sent from the server to the client in response to a database query has relatively limited influence on the overall processing cost of data retrieval. Instead, the access operation itself accounts for the majority of the processing time and thus forms the processing bottleneck. When the client and server are connected in a wide-area network (WAN), the amount of data transmitted does influence the data retrieval cost, but the access operation continues to account for a significant portion of the cost. In both environments, the overall efficiency of the system can be increased by retrieving as much of the working set as possible during each retrieval operation, with a larger efficiency gain being realized in the LAN environment. This is where the read-ahead operation comes into play: if a database retrieval is required for one object that an application requires access to, it is more efficient to retrieve additional objects at the same time—assuming, of course, that the objects retrieved in the read-ahead are those that will actually be used by the application in its subsequent operations.

Read-ahead and caching each contribute to efficiency and flexibility gains for an executing application, and when used together the gains are even more dramatic. The read-ahead operation retrieves data in advance of when the application is ready to access it, and caching stores the retrieved data in a location from which it can be quickly accessed when it is needed. In an application that does not use read-ahead and caching, the application is always starved for data, reading one object at a time from the data source as further data is needed. When the underlying object model of the application has many associations from one class to another (and therefore many relationships between tables in the database), traversing this model's associations as the application user navigates the model to perform various tasks will typically require access to many objects. When each object is retrieved from the database one at a time, a large number of expensive database round trips will likely be required. This may lead to processing delays that are unacceptable to the application user.

A read-ahead scheme allows the application to minimize the number of database round trips, and therefore reduce the processing delays in the application, by retrieving large object graphs (i.e. multiple objects, having interrelationships that form a graph structure) within one query. In this approach, read-ahead preferably involves instantiating the requested objects and caching the data for their related objects, thereby making sure that the data is present for the objects that are most likely needed next by the application (but without the time and storage overhead that would be required if all retrieved objects were immediately instantiated).

For most object applications, the relationships (referred to equivalently herein as "associations") between object classes provide a semantically meaningful way for controlling retrieval of objects from the database. As the application traverses a particular relationship, the related objects can be retrieved accordingly (from the cache, if they have been retrieved and cached in a read-ahead operation, or from the data repository if they are not locally available). Using the project-inquiry task described earlier, the employees for the manager's department will typically have already been retrieved and instantiated before beginning the traversal of the employee to project relationship. The traversal then necessitates retrieving the appropriate project objects. How much of an object graph to read ahead depends on the application context. For example, a graphical user interface ("GUI") component of an application may need only a few levels of an object graph. A report writing batch subsystem, on the other hand, may need to load the entire graph.

Therefore, within the same application it is desirable to be able to dynamically define the depth of the object graph that will be loaded upon issuing a database retrieval query. In the GUI example above, the depth to be loaded will preferably be relatively shallow, whereas in the report writing example, the depth will preferably be relatively deep. In existing object-oriented systems, a relationship from one class to another is typically encapsulated within one of the classes and thus can only be accessed by invoking a method on an object in that class. This results in an object model with relationships that are tightly bound to particular hard-coded database queries—i.e. to those queries which the programmer has provided as encapsulated methods. This existing approach prevents loading object graphs of dynamically varying depths. It would be preferable if each relationship had access to a set of queries, each providing a different object graph load depth, where the query to perform in a particular situation could then somehow be determined based on the application context. This would be especially beneficial where the queries to be performed are static, pre-compiled queries (such as Structured Query Language, or SQL, queries) and in heterogeneous environments where one server may use services of another. For example, a client workstation may be connected to an object server which selects and retrieves instantiated objects (which the object server separately requests and receives from a database server). Furthermore, there may be several intervening systems in between the server connected to the client and the database server. In these heterogeneous environments, the application executing on the client workstation does not issue database queries: rather, database queries are typically only issued by the server connected to the database server. In this type of distributed system, there may be many "generic" queries (implemented as service invocations, for example) available for use by many applications, where the queries are very similar in function but also vary somewhat. Typically, the client will invoke a query that is stored in the client to access a database, or will invoke one of these services that is stored in a remote server in order to request the remote system to issue the corresponding database query. (Hereinafter, references to queries are to be interpreted as referring equivalently to these types of service invocations, unless otherwise stated.) In this case, a technique is needed for determining which query to select in a particular situation. When the queries are selected for execution at a system remote from the system on which the application is executing, it becomes difficult for the application to influence the selection using the current application context. The selectable queries remain as fixed, hard-coded logic which cannot be dynamically optimized at run-time to account for the needs of a particular application.

Accordingly, what is needed is a technique whereby the information to be retrieved in a query operation, and in particular a query operation intended as a read-ahead retrieval, can be efficiently selected and executed.

SUMMARY OF THE INVENTION

An object of the present invention is to provide a technique for efficiently selecting an optimal query to use for retrieving information with a data repository query operation.

Another object of the present invention is to provide a technique for efficiently selecting an optimal service to invoke for retrieving information from a data repository.

A further object of the present invention is to provide this technique such that data can be efficiently retrieved in a read-ahead operation.

Another object of the present invention is to provide this technique where the source of the retrieved data is a relational or a non-relational database, and where the destination of the data is an application written using an object-oriented programming language.

Still another object of the present invention is to provide this technique in a manner that does not require modification of an application.

Yet another object of the present invention is to provide this technique through use of task working set hints and query signatures.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a method, system, and computer-readable code for optimizing query selection and execution in a computing environment. This technique comprises: providing a plurality of working set hints corresponding to a plurality of finders associated with a plurality of executable tasks, wherein each of the tasks may have one or more of the finders and each of the finders may have zero or more of the hints; providing a query signature corresponding to each of a plurality of executable queries; locating a default query if a task to be executed or a finder to be used by the task has no corresponding hints, and for locating the corresponding hints for the finder of the task otherwise; using the located hints to select one of the queries to execute; and executing the default query or the selected query.

Preferably, each of the hints describes data to be read ahead for use by the corresponding task, and each of the query signatures describes data to be retrieved by the corresponding query.

Using the located hints may further comprise comparing the located hints to the plurality of query signatures and selecting a particular one of the queries for which the corresponding query signature matches the located hints. Selecting a particular one may further comprise selecting a best-matching one of the queries based on a result of the comparison.

The present invention will now be described with reference to the following drawings, in which like reference numbers denote the same element throughout.

BRIEF DESCRIPTION OF THE DRAWINGS

FIGS. 3A–3C show a simple example of data values stored in relational database tables, according to the prior art.

FIG. 4 illustrates an example of working set hints corresponding to example tasks, in accordance with the present invention;

FIG. 5 illustrates an example of query signatures corresponding to example queries, in accordance with the present invention;

FIGS. 7 through 15 provide flowcharts illustrating the logic with which a preferred embodiment of the present invention may be implemented.

DESCRIPTION OF THE PREFERRED EMBODIMENT

Figure 1:
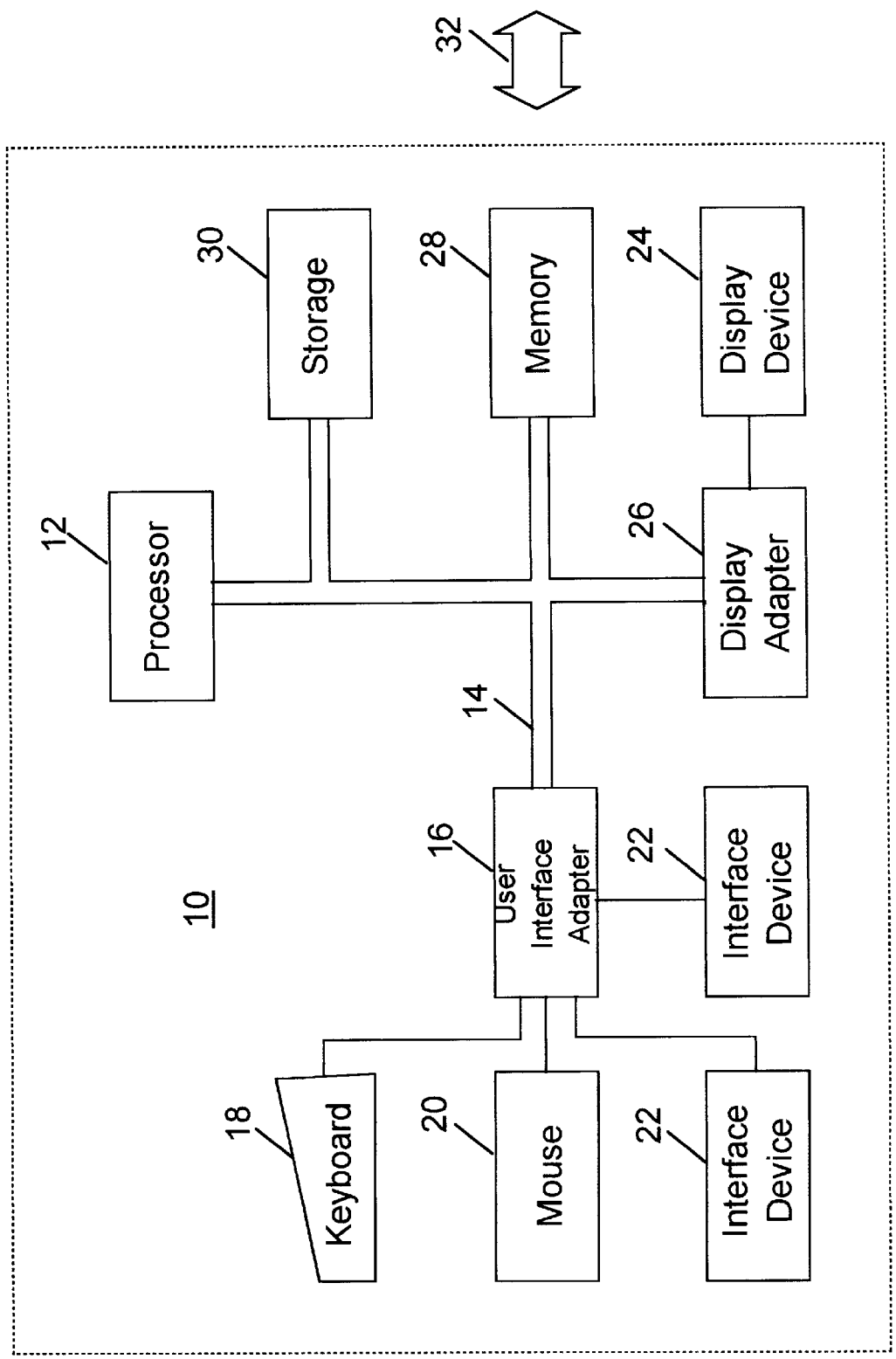
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate with other computers or networks of computers, for example via a communications channel or modem 32. Alternatively, the workstation 10 may communicate using a wireless interface at 32, such as a CDPD (cellular digital packet data) card. The workstation 10 may be associated with such other computers in a LAN or a WAN, or the workstation 10 can be a client in a client/server arrangement with another computer, etc. All of these configurations, as well as the appropriate communications hardware and software, are known in the art.

Figure 2:
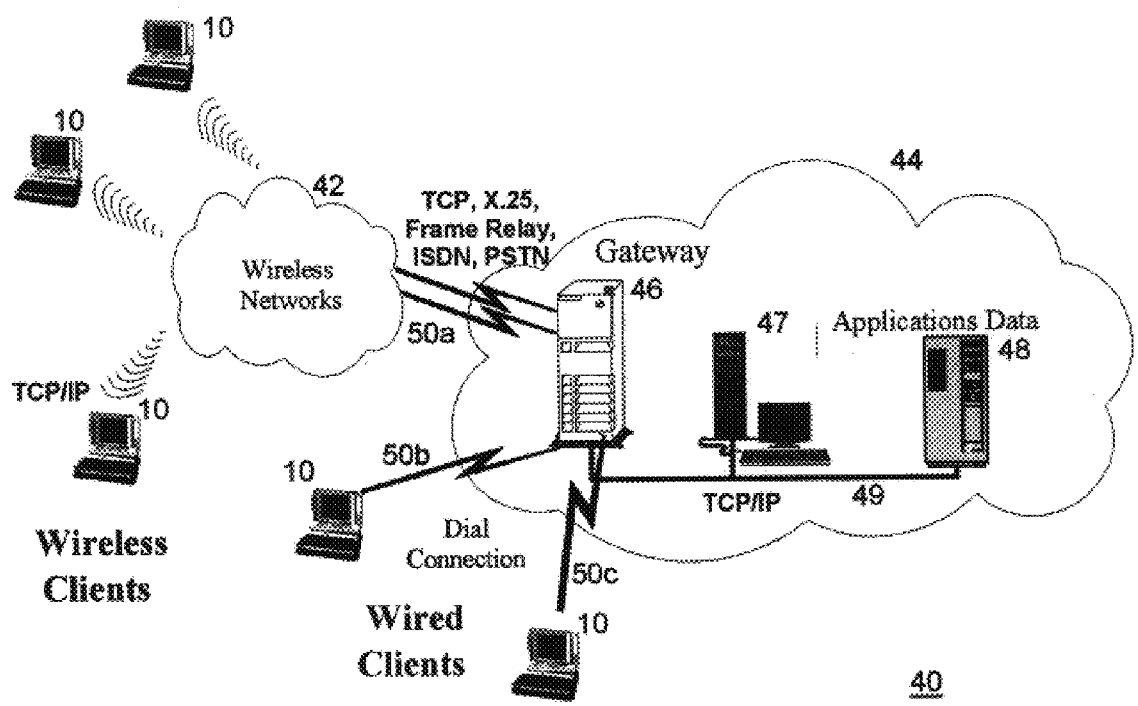
FIG. 2 is a diagram of a networked computing environment in which the present invention may be practiced.

FIG. 2 illustrates a data processing network 40 in which the present invention may be practiced. The data processing network 40 may include a plurality of individual networks, such as wireless network 42 and network 44, each of which may include a plurality of individual workstations 10. Additionally, as those skilled in the art will appreciate, one or more LANs may be included (not shown), where a LAN may comprise a plurality of intelligent workstations coupled to a host processor.

Still referring to FIG. 2, the networks 42 and 44 may also include mainframe computers or servers, such as a gateway computer 46 or application server 47 (which may access a data repository 48). A gateway computer 46 serves as a point of entry into each network 44. The gateway 46 may be preferably coupled to another network 42 by means of a communications link 50a. The gateway 46 may also be directly coupled to one or more workstations 10 using a communications link 50b, 50c. The gateway computer 46 may be implemented utilizing an Enterprise Systems Architecture/370 available from the International Business Machines Corporation ("IBM"), an Enterprise Systems Architecture/390 computer, etc. Depending on the application, a midrange computer, such as an Application System/400 (also known as an AS/400) may be employed. ("Enterprise Systems Architecture/370" is a trademark of IBM; "Enterprise Systems Architecture/390", "Application System/400", and "AS/400" are registered trademarks of IBM.)

The gateway computer 46 may also be coupled 49 to a storage device (such as data repository 48). Further, the gateway 46 may be directly or indirectly coupled to one or more workstations 10.

Those skilled in the art will appreciate that the gateway computer 46 may be located a great geographic distance from the network 42, and similarly, the workstations 10 may be located a substantial distance from the networks 42 and 44. For example, the network 42 may be located in California, while the gateway 46 may be located in Texas, and one or more of the workstations 10 may be located in New York. The workstations 10 may connect to the wireless network 42 using a networking protocol such as the Transmission Control Protocol/Internet Protocol ("TCP/IP") over a number of alternative connection media, such as cellular phone, radio frequency networks, satellite networks, etc. The wireless network 42 preferably connects to the gateway 46 using a network connection 50a such as TCP or UDP (User Datagram Protocol) over IP, X.25, Frame Relay, ISDN (Integrated Services Digital Network), PSTN (Public Switched Telephone Network), etc. The workstations 10 may alternatively connect directly to the gateway 46 using dial connections 50b or 50c. Further, the wireless network 42 and network 44 may connect to one or more other networks (not shown), in an analogous manner to that depicted in FIG. 2.

Software programming code which embodies the present invention is typically accessed by the microprocessor 12 of the workstation 10 or server 47 from long-term storage media 30 of some type, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

A user of the present invention may connect his computer to a server using a wireline connection, or a wireless connection. Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The user's computer may be any type of computer processor, including laptop, handheld or mobile computers; vehicle-mounted devices; desktop computers; mainframe computers; etc., having processing and communication capabilities. The remote server, similarly, can be one of any number of different types of computer which have processing and communication capabilities. These techniques are well known in the art, and the hardware devices and software which enable their use are readily available. Hereinafter, the user's computer will be referred to equivalently as a "workstation", "device", or "computer", and use of any of these terms or the term "server" refers to any of the types of computing devices described above.

The computing environment in which the present invention may be used includes an Internet environment, an intranet environment, an extranet environment, or any other type of networking environment. These environments may be structured using a client-server architecture, or a multi-tiered architecture, whereby a client-server environment is extended by adding data repositories as an additional tier (such that one or more servers now occupy the tiers in the middle), and where these data repositories contain information that may be accessed by the server as part of the task of processing the client's request.

The preferred embodiment of the present invention will now be discussed with reference to FIGS. 3 through 15.

In the preferred embodiment, the present invention is implemented as a computer software program. The program code of the preferred embodiment is implemented as objects (classes and methods) in the Java object-oriented programming language. ("Java" is a trademark of Sun Microsystems, Inc.) However, the inventive concepts disclosed herein may be used advantageously with other programming languages, whether object-oriented or procedural. The program implementing the present invention will be used where a read-ahead scheme is implemented to retrieve data from a database before it has been requested by an executing application.

A Java development environment typically includes class libraries for use by developers when programming (i.e. developing applications) in the Java language. Class libraries are reusable sets of reusable classes which typically provide relatively high level functionality. A class is one of the basic building blocks of object-oriented languages such as Java, and comprises code which represents a combination of logic function and data. An object is an instance of a class. These concepts and techniques of Java programming are well known, and will not be discussed in depth herein.

The concept of a persistent store is well known to those skilled in the art, and will not be described in detail herein. In a client/server or multi-tiered environment, a persistent store of objects may be maintained in one or more locations which are accessible by applications (and their users) in the computing environment, such as one or more common databases. Such databases may be maintained in, for example, the data repository 48 of FIG. 2 or the long term storage 30 of FIG. 1.

Very often the working set of a task is at least partially known ahead of time. Experience in executing the tasks of an application typically yields an even better understanding of the working set, which accounts for how the application users actually traverse the application's object model. If the queries used to retrieve object graphs during traversal of the relationships in the object model are only available as fixed services according to the prior art, then the programmer must change the application to optimize its performance to reflect the knowledge of the working set that is gained by experience. Changing an application in this manner is a labor-intensive and error-prone task, and therefore does not provide a suitable solution. Without the ability to tailor the query selection process, traversing a particular relationship will always retrieve either too little or too much of the object graph because invocation of the query associated with that relationship is fixed and therefore can be optimized only for one task. The result is object systems which will never perform optimally.

The present invention defines a technique for using working set hints and query signatures to optimize the selection (and therefore execution) of fixed, static queries. A mechanism is defined that enables providing "hints" of the working set for a particular task, where these hints are preferably stored independently of the application code and the object model. In the preferred embodiment, the hints are provided by a person such as a programmer or systems administrator (using, for example, a text editor or a specially-adapted input program). Alternatively, automated techniques might be used to generate the hints. Because the hints are preferably stored externally, the hints are easily changeable as knowledge is gained of each task's true working set. A technique is defined for using these working set hints to select an optimal query to load an appropriate level of an object graph for traversing relationships within a task.

Figure 3D:
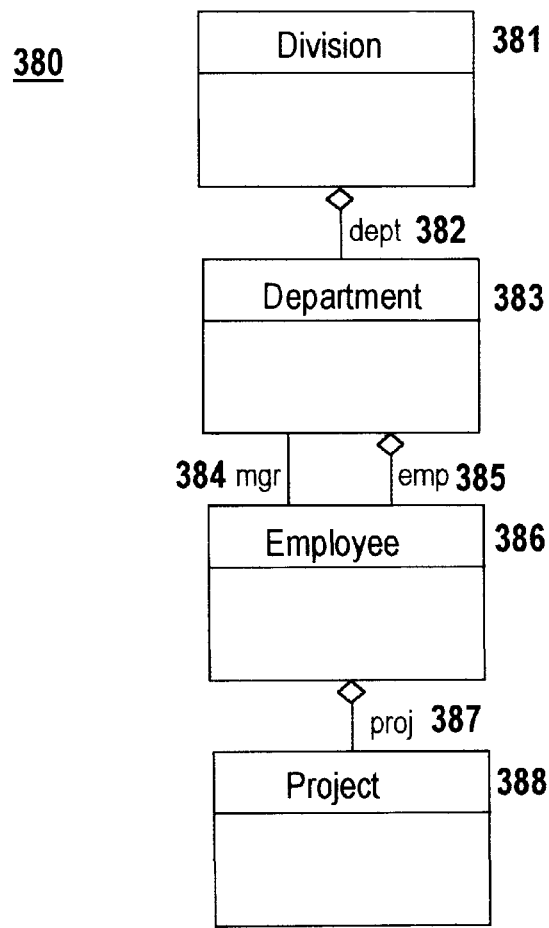
FIG. 3D shows an object model corresponding to these tables.

The technique with which the present invention is used to optimize query selection and execution will be explained with reference to the example data in FIGS. 3A–3C and the example object model of FIG. 3D. FIGS. 3A–3C illustrate a simple example of data values stored in relational database tables, according to the prior art. For this example, which has been briefly discussed earlier herein, the tables of interest are Employee 300, Department 330, and Project 360 tables. Each row 301, 302, 303, 304 in the Employee table 300 contains informnation for a single employee. The Employee table 300 is organized by employee number 305, which serves as the primary key for accessing the table and therefore is a unique element of each row. In this example, each row also has fields (illustrated as columns) for the employee's name 306, department number 307, and project number 308. The department number field 307 is a foreign key in this example, linking each employee row with the row from the Department table 330 representing the department in which this employee works. The project number 308 is also a foreign key, linking an employee row with a row from the Project table 360. (It will be obvious to one of ordinary skill in the art that the tables used in FIG. 3 have been simplified to illustrate the present invention, and that tables used for actual applications will typically have many more fields and many more rows than those shown in FIG. 3.)

The Department table 330 uses department number 335 as its primary key. Additional fields of this table are the manager number 336 and department name 337. The manager number 336 is a foreign key, identifying the row from the Employee table 300 that contains information for the employee who is the manager of this department. The Project table 360 uses the project number 365 as its primary key. It further contains a field for the project name 366.

Relationships between tables in the database correspond to associations between objects in the object model. An application user will typically navigate the object model using these associations. For example, if the detailed information for an employee is currently being displayed in an application window, the user may decide to display a window containing information about this employee's department, which requires the application to navigate an association between employees and departments. Or, the user may decide to view the project this employee works on, which requires navigating an association between employees and projects.

Association information is an integral part of an object model. FIG. 3D illustrates the object model 380 of which the tables in FIGS. 3A–3C are a part. The object classes of the model are Division 381 (for which no example table is provided); Department 383 (corresponding to the table 330 in FIG. 3B); Employee 386 (corresponding to the table 300 in FIG. 3A); and Project 388 (corresponding to the table 360 in FIG. 3C). Division 381 has a one-to-many relationship with Department 382, where this relationship is denoted as "dept" at 382. Department 383 has a one-to-one relationship with Employee 386, denoted as "mgr" 384, and a one-to-many relationship "emp" 385. In other words, a department has one manager and a manager manages one department, while a department may have many employees, each of which is an employee of a single department. Finally, Employee 386 has a one-to-many relationship with Project 388, denoted as "proj" 387.

According to the present invention, each task (or transaction, equivalently) to be executed by an application is assigned a task identifier. A programmer assigns a description of the task's working set to the task identifier (in particular, to finders used by the task, as will be described in more detail below), and preferably stores this information in a file that is external to the application code, such as a deployment descriptor or configuration file (referred to hereinafter as a configuration file for ease of reference). As previously discussed, because the working set description is held in an external resource, it can be updated without modifying and re-compiling the application when more experience is gained about the usage patterns of the associated task.

A working set description can be either partial or complete. The description comprises statements having semantics such as "when a department is needed, its manager and employees and their projects are needed too" or "when an employee is needed, his projects are needed too". As will be obvious to one of skill in the art, many notations could be developed to convey these semantics. For purposes of illustrating use of the present invention, one such notation has been adopted and is shown in FIG. 4. FIG. 4 represents a sample correlation 400 between task identifiers 410, the finders 420 used by these tasks, and working set descriptions 430 (referred to equivalently herein as "working set hints"). A "finder" is a term used to denote a subroutine-like invocation that searches for an object. Suppose the task which loads the manager and employees for a department being loaded, along with their projects, has the task identifier "Dept-mgr-emp-proj" 411. Further suppose that this task 411 uses a finder which has the name "EmplFindByDept" 421. The working set description for this finder may then be represented as shown at 431. In the notation used to describe working sets in FIG. 4, the first token names the target class of a query (i.e. the class that is to be loaded for immediate use by the task). Thus, "Department" 432 indicates that the task needs to load Department information—to traverse, for example, from a Division 381 to a Department 383. The remaining clause 434, separated from the target class name with the special character "." 433, specifies the relationships that form the working set hint. The "." character indicates retrieval that is to be performed across an association, and the "&" character indicates retrieval of a sibling association.

Thus in example 431, the "." 433 indicates a retrieval across an association between Department 432 and mgr 435 as well as a retrieval across an association between Department 432 and emp 437, where the sibling relationship among mgr 435 and emp 437 is indicated by the "&" 436. For the emp 437 objects retrieved, proj 439 objects are also to be retrieved using the association (indicated by "." 438) between emp 437 and proj 439. Parentheses are used in the working set hint to indicate grouping of relationship information. Another task may have the name "Display-employees" 412, which uses finders 422 and 423. The working set description for this task's finders may then be represented as shown at 441, 442 where each finder has a different hint. The first of these hints 441 retrieves projects as well as employees, using the "proj" relationship, and the second hint 442 retrieves objects using the "mgr" relationship. While only two example task identifier-to-working set description examples have been shown in FIG. 4, it will be obvious that an actual application will typically have many more than two such entries in its externally-located configuration file.

As previously stated, some hints may be complete and some hints may be partial. If multiple partial hints are provided for a particular finder, these hints may be parsed and merged at run-time to generate a single hint for the finder. For example, if a finder has one hint indicating that employees are to be retrieved for departments, and another hint indicating that the manager is to be retrieved for departments, the parsing process may merge these hints to yield a composite hint (indicating retrieval of (1) both employees and managers, or (2) either employees or managers, as may be desired).

FIG. 5 depicts an example of the query signatures that may be used with the present invention. As with the working set hint notation, many notations could be developed for representing a query signature, and the syntax used in FIG. 5 is merely one possible notation that may be used. For each query 510, a signature 520 is defined and stored by the query developer. Although FIG. 5 is depicted in tabular format for ease of illustration, the queries are preferably stored in finders in target object homes. A "home" is a term used to denote the interface where the finder routine is available. Finder routines and homes are well known to those of skill in the art, and will not be described in detail herein. The Enterprise JavaBeans ("EJB") specification specifies that application and object relationships invoke finders in target object homes to retrieve objects from the data repository. ("JavaBeans" is a trademark of Sun Microsystems, Inc. The EJB specification may be found at http://java.sun.com/products/ejb/newspec.html.) Conventionally, each finder is based on a single query. According to the present invention, however, a finder may have a pool or collection of queries from which to select, where each query in the pool retrieves not only the target object(s) but also varying levels and branches of the associated object graph. Each query in a finder's pool has an associated signature which describes what the query does. The signature for a particular query may be retrieved by invoking a method which returns the stored signature. To find the signatures for all queries in a pool, the method would then be invoked for each query in the pool. (Alternatively, the query signatures may be externally stored in a table.)

Query 511 is depicted using the Structured Query Language ("SQL"), and retrieves a department, its manager and employees, and the employees' projects. (Note that this query 511 assumes manager information is stored in a separate table from employee information, in contrast to the approach discussed previously with reference to FIG. 3.)

The signature 521 represents the information that will be retrieved by the query, specifying with the first token that a Department 522 will be loaded, and with the "." syntax 523 that the additional information to be loaded (at a next lower level of the object graph) is determined by the "mgr" relationship 524 and (shown by the "&" syntax 525) by the "emp" relationship 526, where the "." syntax 527 then indicates that the "proj" relationship 528 (at yet another lower level of the graph) is also retrieved. Query 531 retrieves an employee and his projects, and has the signature 541 to convey this information. The target class of a query 510 is specified in its signature 520 as the first token. Upon executing a query, the target class will then form the root of the retrieved object graph. The relationships in the signature describe the structure of that graph.

Figures 6A, 6B:
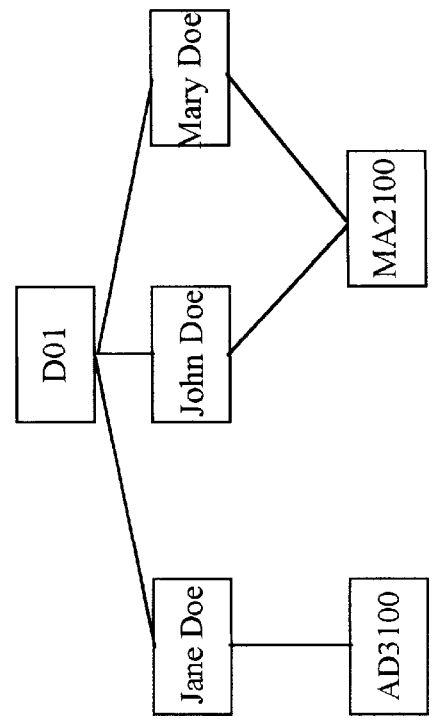
FIGS. 6A and 6B illustrate an example of data retrieved from a data repository using a sample query, and a corresponding object graph.

Assuming the database contents are those shown in FIG. 3, the query command that retrieves all employees who work in department D01 and the project for each employee returns the data represented by the rows shown in FIG. 6A. In SQL, this query command may be specified as "SELECT*FROM Department, Employee, Project WHERE Department.DeptNo='D01' AND Department.DeptNo= Employee.DeptNo AND Employee.ProjNo= Project.ProjNo". (Note that if the possibility exists for employees to not be assigned to a project, then this equi-join operation would omit those employees from the result set. To avoid this, and create a result set where the employee is represented without corresponding information from the project table, a left outer join operation should be used instead of an equi-join when joining employees and projects. These techniques are well known to those of skill in the art.) One department 331 exists in the Department table 330 satisfying this primary key equal to "D01" requirement, and three employees 301, 302, 304 in the Employee table 300 have this department number in the foreign key field 307. Two projects 361, 362 in the Project table 360 are referenced from these three employees through the foreign key field 308. As will be obvious to one of ordinary skill in the art, the result of the above join operation therefore yields 3 rows, and these rows have the content shown in FIG. 6A.

FIG. 6B depicts the object graph corresponding to the retrieved data in FIG. 6A, where only a representative portion of the retrieved data has been shown in the nodes of FIG. 6B for ease of illustration. The SQL query which retrieved the rows in FIG. 6A is very similar to the example query 511 of FIG. 5 (omitting only the "mgr" relationship), and thus the object graph in FIG. 6B is very similar to the object graph that would be associated with query 511 and query signature 521.

When a task begins execution, an implementation of the present invention retrieves the task identifier that has been assigned to that task. In an object-oriented programming environment, this may be implemented by defining each task object to have a method such as "task_ID" which answers the task identifier upon invocation. This task identifier is then used to retrieve the externally-stored working set hints from the configuration file. This description is then stored in storage or memory that is accessible by the executing task.

When the executing task traverses an association, the present invention preferably uses the logic depicted in FIGS. 7 through 15 to retrieve the needed object(s) in the target class of the association and, at the same time, to also read ahead and retrieve objects which the working set hints indicate are likely to form the working set which this task will be needing soon. This read-ahead processing is transparent to the executing task and application. The process begins at Block 700 of FIG. 7, where a test is made to determine whether the association already has a value. For example, if a Division to Department association (see element 382 of FIG. 3D) is being traversed, at least one Division record is already available to the executing task. Block 700 comprises determining whether a Department record (such as that represented by row 331 of FIG. 3B) is also available as a value of the Division-to-Department association (i.e. the value is already stored in the memory of the application in which the task is running). If so, then control transfers to Block 730 and the association's value is returned for use by the task. The processing of FIGS. 7 through 15 is then complete for this invocation.

Figure 7:
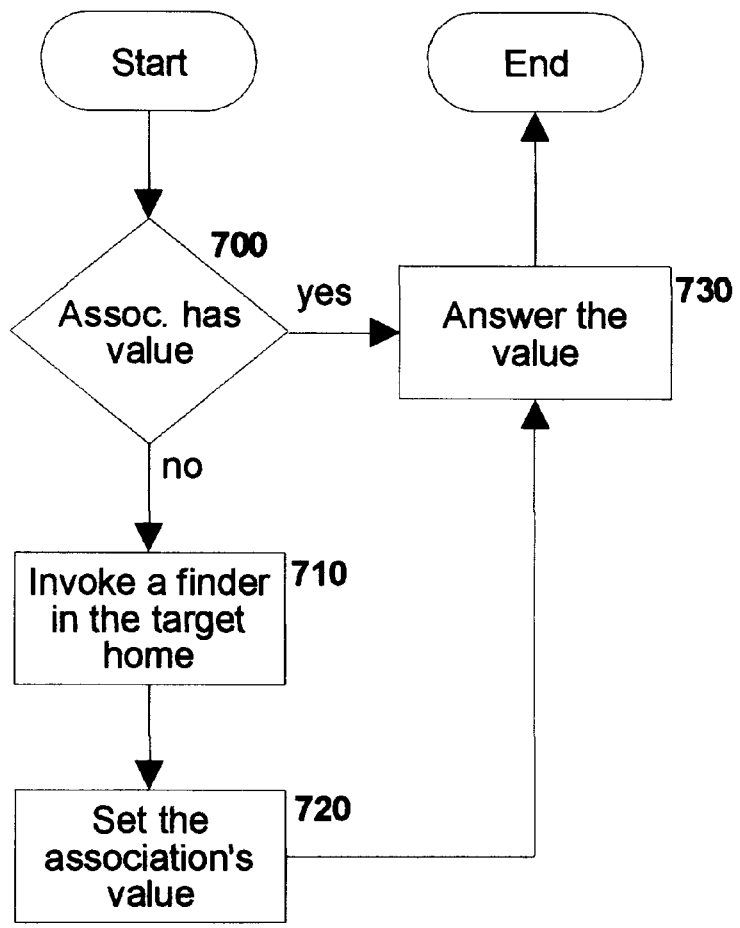

When Block 700 has a negative result (i.e. the association being traversed has a null value), Block 710 invokes a finder in the target home. The technique with which a finder is invoked to comprise the processing of Block 710 is described in more detail below, with reference to FIG. 8. Following completion of this invocation, processing continues at Block 720 where the association's value can now be set using the information retrieved by the finder. Control then transfers to Block 730, where the association value is returned to the task. The processing of FIG. 7 is then complete for this invocation.

Figure 8:
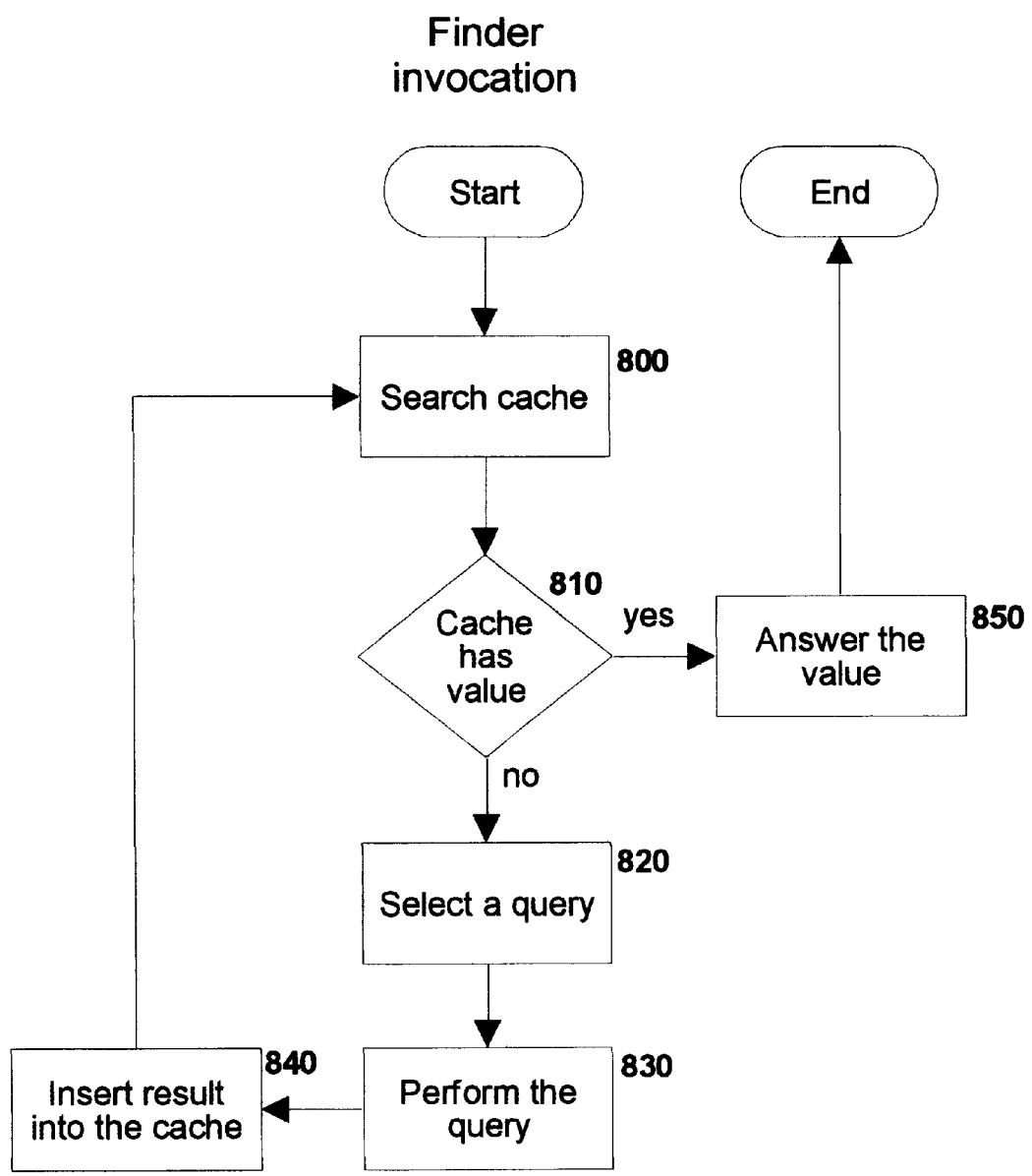

FIG. 8 depicts the logic with which a finder is preferably invoked, according to the preferred embodiment of the present invention. Caching may optionally be used with an implementation of the present invention. If the application maintains a cache of data, Block 800 searches this cache to determine whether the target association value is stored in the cache. (If caching is not implemented, then the logic of Block 800 may be omitted.) U. S. Ser. No. 09/248,561, filed Feb. 11, 1999, which is titled "Structured Cache for Persistent Objects" and is assigned to the same assignee as the present invention, describes a technique for instantiating persistent objects from data retrieved with a database query. Data retrieved from a database query is first stored in a data cache as unstructured (i.e. binary) data. As an application executes, objects that are needed by the application are instantiated and hydrated using this data cache and then stored in an object cache. Entries in an association cache are also created from the data retrieved from the repository, where this association cache stores information about associations between object classes. Preferably, this structured cache will be used with the present invention, although other caching approaches may be used without deviating from the inventive concepts disclosed herein.

If the value of the target object was not located by Block 800, then Block 810 has a negative result and processing continues at Block 820. Otherwise, the value located in the cache is returned at Block 850, after which the processing of FIG. 8 is complete. Block 820 selects a query to be used to retrieve the target object (and the object graph that is used to read ahead, according to the present invention) from the data repository. This query selection process is depicted in more detail in FIG. 9, which is described below. Upon completion of Block 820, Block 830 executes the selected query. Block 840 then inserts the query results into the cache, when caching is being used, and returns control to Block 800 in order to use the cached value for returning to the invoking code. (Alternatively, control may transfer to Block 850 to answer the value retrieved by the query in Block 830.)

Figure 9:
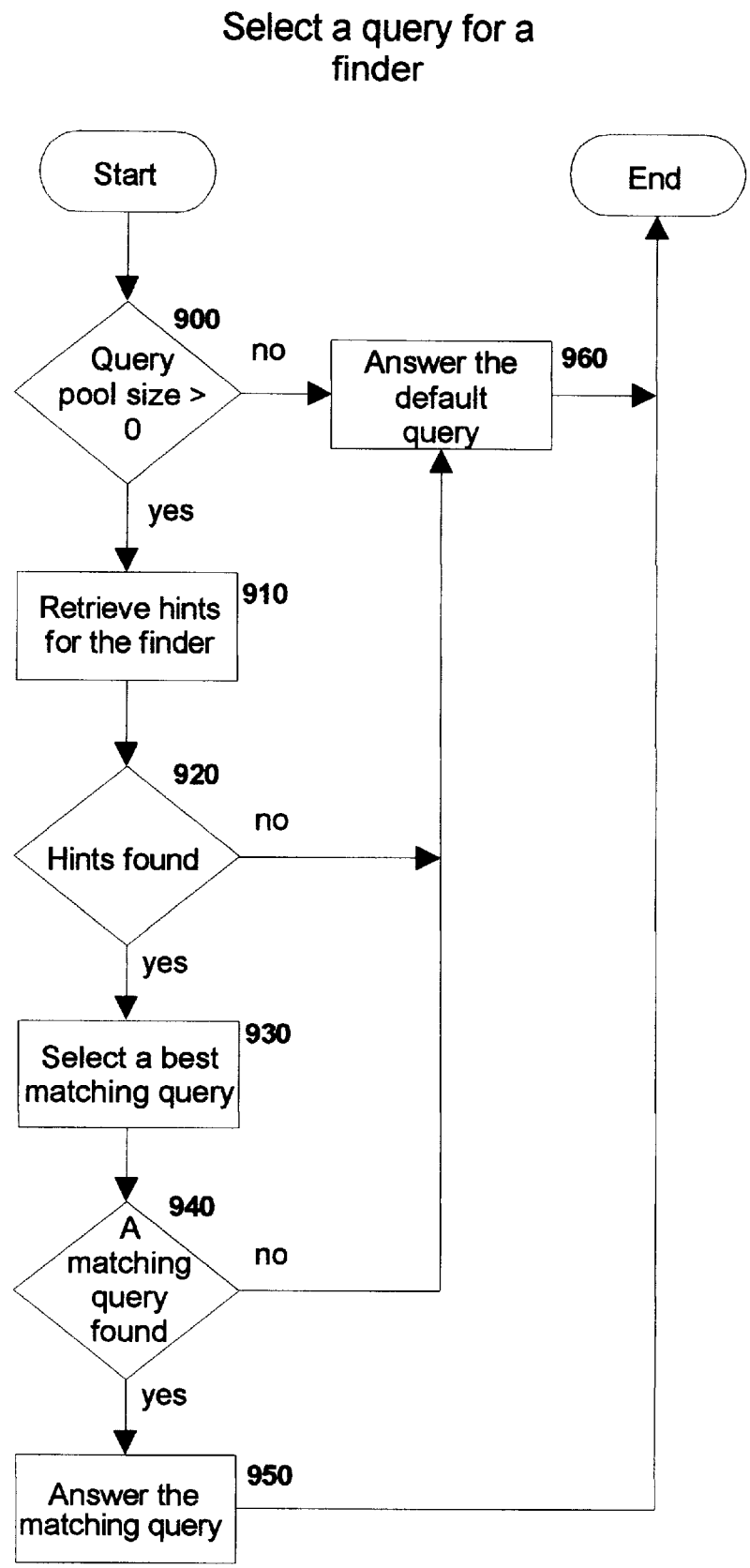

FIG. 9 illustrates the preferred embodiment of the logic used to select a query for the processing of Block 820 of FIG. 8. Block 900 checks to see if the query pool for this finder has a size greater than zero—that is, whether it has any entries. When the query pool is stored as a collection, a "getQueries" or similarly-named method may be used to retrieve the queries in the query pool. When the collection is empty, this method may return a null value, in which case Block 900 has a negative result. Or, the size of the collection may be returned, in which case a zero is returned for an empty collection. Encountering a negative result at Block 900, a default query will be returned by Block 960. (Typically, a default query will retrieve only the target object, without performing additional read-ahead.) The processing of FIG. 9 ends after returning a default query.

Figure 10:
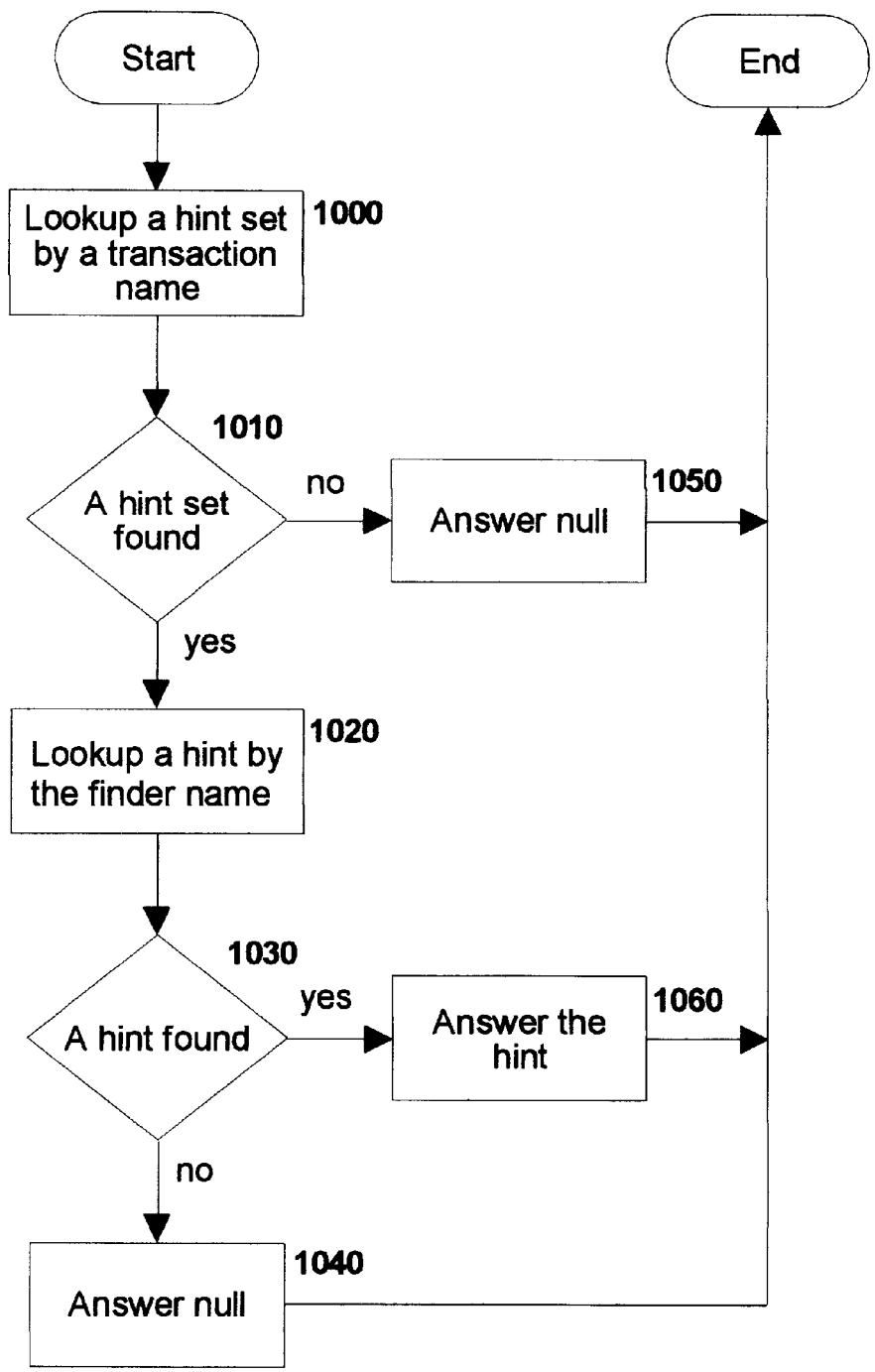
Figure 11:
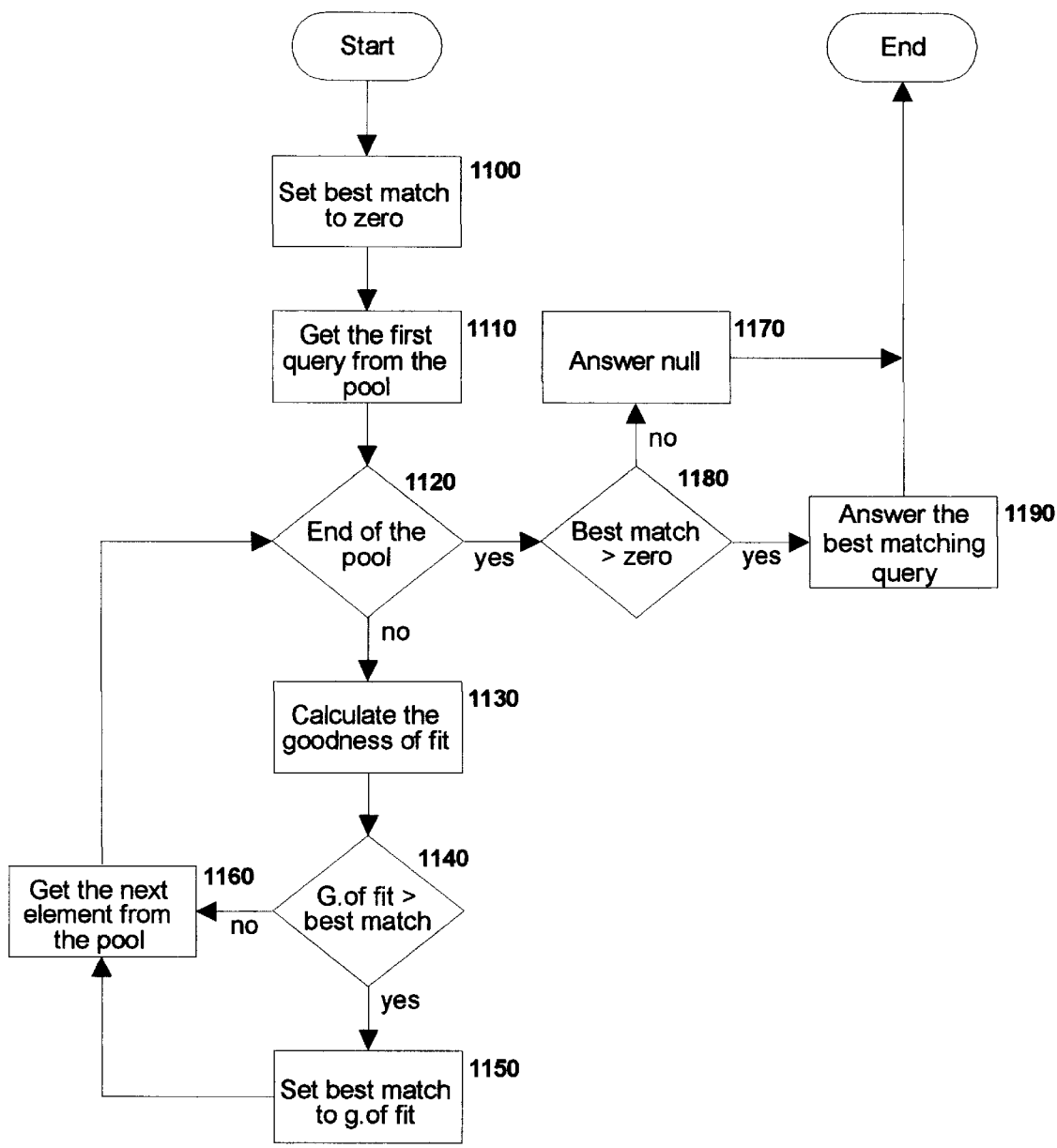

When there are queries in the query pool (i.e. Block 900 has a positive result), Block 910 retrieves the working set hints to be used by the finder. FIG. 10 depicts the details of this hint retrieval processing, and is described below. After returning from the appropriate invocation, Block 920 asks whether any hints were found. If not, a default query is returned by transferring control to Block 960, as previously discussed. Otherwise, Block 930 selects the query which best matches the retrieved working set hints. FIG. 11 depicts the logic with which this selection process is preferably performed. Block 940 then asks whether a matching query was located by the processing shown in FIG. 11. If not, a default query is returned (Block 960). Otherwise, Block 950 returns the located matching query, and the processing of FIG. 9 ends.

FIG. 10 illustrates the preferred embodiment of the logic with which a finder's working set hints are to be retrieved. At Block 1000, the task's (equivalently, a transaction's) identifier or name is used to access the externally-stored configuration table (see column 410 of FIG. 4). If no hints are found for this task identifier, Block 1010 has a negative result and a null value will then be returned by Block 1050 (which will then cause Block 920 to have a negative result). If hints are found, then Block 1020 searches through these hints to locate those which have the finder's name specified (see column 420 of FIG. 4). If a hint is found for the finder's name (a positive result at Block 1030), it is returned by Block 1060; otherwise, Block 1070 returns a null value.

FIG. 11 illustrates the preferred embodiment of the logic with which the query which best matches a working set hint is determined. The technique shown in FIG. 11 is for purposes of illustration, and not of limitation: other techniques may be used without deviating from the inventive concepts of the present invention. The technique of the preferred embodiment begins by initializing a "best match" indicator to zero in Block 1100 to indicate that no best match has yet been found. Block 1110 then gets the first query from the query pool associated with the target object or association. If this is the end of the pool (i.e. there are no more entries in the pool), Block 1120 has a positive result, and control transfers to Block 1180. When Block 1120 has a negative result, Block 1130 calculates how good the fit is between the hint located by FIG. 10 and the query currently being evaluated (i.e. the query retrieved by either Block 1110 or Block 1160, as appropriate). This process is depicted in more detail in FIG. 12, described below. Block 1140 tests whether the goodness of fit of the current comparison is better than the value of the best match indicator. If the current goodness of fit is greater, then the currently-evaluated query is a better match for the working set hint than any previously-evaluated queries, and thus Block 1150 will set the best match indicator to the new goodness of fit value for the current query. After changing the best match indicator, or following a negative result in Block 1140 (which indicates that the currently-evaluated query was a worse fit than a previously-evaluated query), Block 1160 gets the next query from the query pool and control returns to Block 1120 to begin evaluation of that query.

Upon reaching Block 1180, all queries in the query pool have been compared to the working set hint. If the value of the best match indicator is greater than zero (a positive result in Block 1180), then some query has been located which is a good fit with the working set hint. In this case, that query is returned by Block 1190. Otherwise, when the best match indicator has not been set to a value greater than zero, no query was located which is a good fit for the hint, and a null result is returned by Block 1170.

Figure 12:
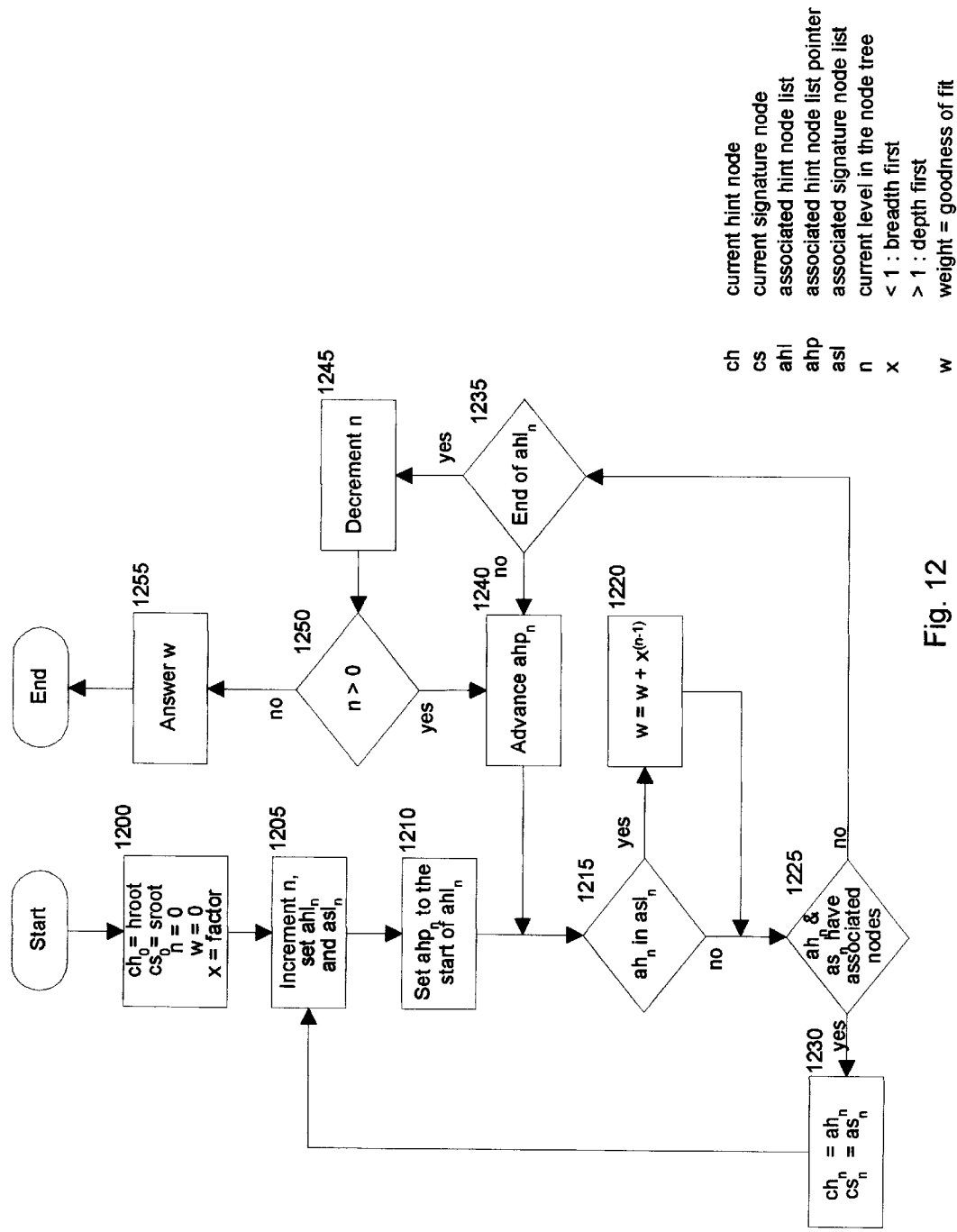

FIG. 12 depicts the logic of an algorithm that may be used with the present invention to calculate the goodness of fit of a signature, compared to a particular working set hint. Note that this is merely one technique with which goodness of fit may be calculated; other techniques may be used without deviating from the inventive concepts of the present invention.

Figure 13:
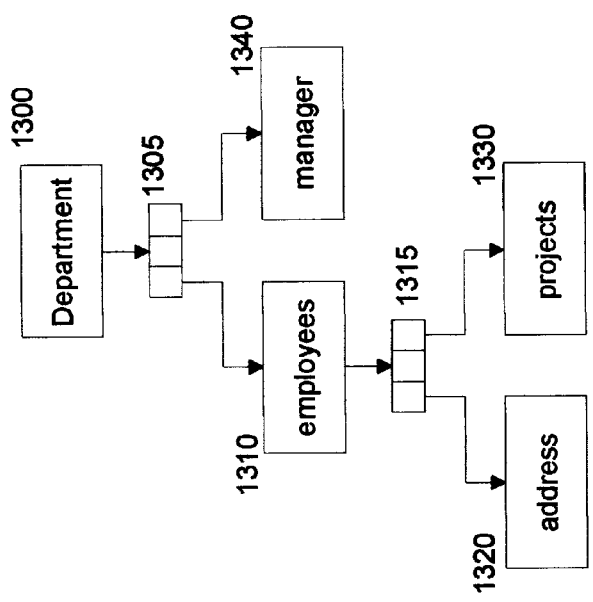

FIG. 13 depicts an example object structure that may be generated by a parser at run-time to represent a hint, as well as to represent a signature, where the structure takes the form of a graph. This object structure is preferably used by the algorithm of FIG. 12, as will be illustrated with reference to a target hint example shown in FIG. 14 and several example candidate signatures shown in FIG. 15. The root of the graph represents the target class of the hint (or the top-level object that will be retrieved with a signature). For purposes of discussion, suppose this example represents a hint. The hint itself is shown at 1350, using the syntax described earlier with reference to FIGS. 4 and 5. Thus, the root 1300 represents the Department class that is the target of the hint. The symbols at 1305 and 1315 are used to indicate that a collection of nodes follows at a next level of the graph structure. The level beneath Department 1300 comprises two nodes 1310 and 1340, and the level beneath node 1310 comprises two nodes 1320 and 1330.

The algorithm used in the preferred embodiment assumes that a hint may represent either a complete target graph or a partial target graph, and that the queries in the pool of candidates may retrieve some subset of the target graph or the entire target graph. Thus, the algorithm attempts to find the best match of the candidate signatures to the target hint. The algorithm counts the number of hits (i.e. matches) between the nodes of the target hint and the nodes of each signature that is evaluated. Different tasks may traverse object graphs in a different style, with some tasks traversing breadth-first while others traverse depth-first for example. To account for this, a weighting value is used in the preferred embodiment of the goodness of fit algorithm, where the weight may be set differently for each hint. (The goodness of fit between hints and signatures may alternatively be computed using other approaches to weighting such as defining a weight for each node, as well as by using techniques other than weighting, without deviating from the inventive concepts of the present invention.) This weighting value is then applied to hits at the various levels to influence the outcome of the algorithm. This value will be referred to herein as the factor "x". The factor value is either exponentially increasing or exponentially decreasing from one level to the next, depending on whether it has been defined as greater than 1 or less than 1, respectively. By definition, the level beneath the root is assigned as weighting value of 1, and is computed by raising x to the zero power. Weighting values of subsequent levels are computed by raising x to the power of (the level minus 1), as will be described below. It can be seen by inspection that a weighting value greater than 1 favors a depth-first traversal, whereas a value less than 1 favors a breadth-first traversal.

In Block 1200 of FIG. 12, the algorithm is initialized. This comprises setting the initial current hint node to be the root of a graph which represents the target hint; setting the initial current signature node to be the root of a signature graph; setting a variable "n" that identifies the current level within the graph, and which controls the recursion of the algorithm, to zero; setting a variable "w", which accumulates the weight values computed by the algorithm (and which therefore represents the goodness of fit upon completion of the algorithm), to zero; and setting the weighting variable "x" to the hint-specific factor setting for the target hint.

With reference to the example hint of FIG. 14 and the example signature at 1500 of FIG. 15, the processing of Block 1200 sets $ch_0$ to point to node 1400 and sets $cs_0$ to point to node 1500. Assume that the value of "x" is set to 0.5, to favor a breadth-first traversal.

Block 1205 then increments the level counter, which represents traversing to a next level of the graphs being compared. The variables $ahl_n$ and $asl_n$ are also set at this time, and identify the list of nodes in current level of the target hint and the list of nodes in the current level of the candidate signature, respectively. Thus, in the example graphs $ahl_n$ identifies nodes 1410 and 1440, while $asl_n$ identifies the single node 1510.

At Block 1210 the pointer $ahp_n$ is set to point to the first node in $ahl_n$, which for the example sets it to point to node 1410. Block 1215 then checks whether the node pointed to by $ahp_n$, which is referred to in FIG. 12 as $ah_n$, is contained within the list $asl_n$. With reference to the example, this comprises checking whether "employees" in contained within the list having the single node 1510, and thus the "Yes" path is taken to Block 1220. Block 1220 performs the processing for computing the value of a hit, and adding that value to the accumulated goodness of fit value for the signature as a whole. The hit value is computed as $x^{(n-1)}$, which in the example is $0.5^{(1-1)}$, or 1. Block 1220 then adds this hit value to the current value of w (which is zero in this example, to set the new value of w to 1).

Block 1225 is reached when there was no hit in Block 1215, and following completion of Block 1220. Block 1225 checks whether $ah_n$ and $as_n$ each have associated child nodes. If so, then Block 1230 moves the $ch_n$ and $cs_n$ pointers to point to these $ah_n$ and $as_n$ nodes, respectively, after which control returns to Block 1205 to perform the hit comparison at the next lower level of the graph. With reference to the example, the $ch_1$ pointer will be set to point to node 1410 and the $cs_1$ pointer will be set to point to node 1510, causing the hit comparison to be performed for their child nodes at 1420 and 1430 of the hint and at node 1520 of the signature.

Block 1225 has a negative result when either or both of the current $ah_n$ and $as_n$ nodes have no children (in which case traversing to a next lower level cannot produce any more hits). Thus, control transfers to Block 1235 in this situation, where a test is made to determine whether all the nodes at the current level of the hint graph have been processed. If not, then Block 1240 advances the pointer $ahp_n$ to the next node at this level. With reference to FIG. 14, this processing comprises moving the pointer from node 1420 to node 1430, or from node 1410 to node 1440, depending on which level of the graph is currently being processed. After advancing the pointer at Block 1240, control returns to Block 1215 to see if there is a hit with this hint node.

When Block 1235 has a positive result, Block 1245 then decrements the level counter in order to traverse upwards in the graphs. Block 1250 then checks to see if the level counter is greater than zero. If so, there are more levels of the graphs to process, and control transfers to Block 1240 to move to another node in the now-current level; otherwise, the graphs have been completely processed and the result of the goodness calculation is returned to the invoking logic by Block 1255.

By inspection of this algorithm for the remaining nodes of FIG. 14 and the candidate signature at 1500, it can be seen that a result (using x=0.5, as discussed above) of (1+0.5)=1.5 is associated with this candidate signature. The signature at 1530 yields a result of (1+0.5+0.5)=2.0, and the signature at 1570 yields a result of (1+1)=2.0. Thus, the best matching signature is determined to be either of 1530 or 1570, and thus the query associated with one of these signatures will be selected for execution. (As depicted in FIG. 11 at Block 1140, the first signature is selected when multiple signatures have an identical goodness of fit. However, this is merely one choice that may be made: alternative approaches to selecting among candidates with identical goodness values may be used without deviating from the scope of the present invention.) These signatures are considered a better match than signature 1500 because they both retrieve more of the target working set than signature 1500.

A different outcome can be achieved by adjusting the weighting factor. Suppose the value is changed from 0.5 to 0.3, which will place greater value on hits at higher levels of the graph. Still referring to target hint 1400, signature 1500 has a goodness value of (1+0.3)=1.3, signature 1530 has a goodness value of (1+0.3+0.3)=1.6, and signature 1570 has a goodness value of (1+1)+2.0. Thus, this weighting factor selects signature 1570, which will retrieve both the employees 1580 and the managers 1590 that are described in the working set hint at 1410 and 1440. As a further example which favors a depth-first traversal, suppose the weighting factor is set to 2.0. In this case, signature 1500 has a goodness value of (1+2)=3, while signature 1530 has a value of (1+2+2)=5 and signature 1570 has a value of (1+1)=2. Thus, this weighting factor value results in selection of signature 1530. This may be a desirable result if experience indicates that the task is more likely to traverse from employees to their addresses and/or projects than it is to traverse to manager objects, and/or that it is more likely to use the employee and/or project objects before using manager objects.

Thus, it has been demonstrated that the present invention defines an advantageous technique for reading data ahead in database query operations, through use of working set hint descriptions for tasks and signatures for queries along with a matching process which locates a best matching query for a particular task using the task's working set hints. A task's working set hints can be modified over time, as more information about the actual working set is learned through experience with executing the task. This modification is achieved without requiring change or recompilation of the application code which implements the task. By using the present invention, object systems (including large object systems which span multiple servers) are made more flexible and more efficient.

The discussions of persistent storage herein are in terms of using a "database". However, it is to be understood that this is for ease of reference. Any type of persistent store, however organized (such as a file system), may be used without deviating from the inventive concepts disclosed herein.

While the present invention has been described relative to retrieving persistent data from a relational database using Java programming, the basic techniques described herein may be applicable to many types of programming languages and many types of databases or data repositories. Thus, while the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and such modifications as fall within the spirit and scope of the invention.

We claim:

1. A computer program product for optimizing query selection and execution, said computer program product embodied on a computer-readable medium readable by a computing device in a computing environment and comprising:

a plurality of working set hints corresponding to a plurality of finders associated with a plurality of executable tasks, wherein each of said tasks may have one or more of said finders and each of said finders may have zero or more of said hints;

a query signature corresponding to each of a plurality of executable queries;

computer-readable program code means for locating a default query if a task to be executed or a finder to be used by said task has no corresponding hints, and for locating said corresponding hints for said finder of said task otherwise;

computer-readable program code means for using said located hints to select one of said queries to execute; and computer-readable program code means for executing said default query or said selected query.

2. The computer program product as claimed in claim 1, wherein each of said hints describes data to be read ahead for use by said corresponding task and wherein said each of said query signatures describes data to be retrieved by said corresponding query.

3. The computer program product as claimed in claim 1, wherein said computer-readable program code means for using said located hints further comprises:

computer-readable program code means for comparing said located hints to said plurality of query signatures; and computer-readable program code means for selecting a particular one of said queries for which said corresponding query signature matches said located hints.

4. The computer program product as claimed in claim 3, wherein said computer-readable program code means for selecting a particular one further comprises computer-readable program code means for selecting a best-matching one of said queries based on a result of said computer-readable program code means for comparing.

5. A system for optimizing query selection and execution in a computing environment, comprising:

a plurality of working set hints corresponding to a plurality of finders associated with a plurality of executable tasks, wherein each of said tasks may have one or more of said finders and each of said finders may have zero or more of said hints;

a query signature corresponding to each of a plurality of executable queries;

means for locating a default query if a task to be executed or a finder to be used by said task has no corresponding hints, and for locating said corresponding hints for said finder of said task otherwise;

means for using said located hints to select one of said queries to execute; and means for executing said default query or said selected query.

6. The system as claimed in claim 5, wherein each of said hints describes data to be read ahead for use by said corresponding task and wherein said each of said query signatures describes data to be retrieved by said corresponding query.

7. The system as claimed in claim 5, wherein said means for using said located hints further comprises:

means for comparing said located hints to said plurality of query signatures; and means for selecting a particular one of said queries for which said corresponding query signature matches said located hints.

8. The system as claimed in claim 7, wherein said means for selecting a particular one further comprises means for selecting a best-matching one of said queries based on a result of said means for comparing.

9. A method for optimizing query selection and execution in a computing environment, comprising the steps of:

providing a plurality of working set hints corresponding to a plurality of finders associated with a plurality of executable tasks, wherein each of said tasks may have one or more of said finders and each of said finders may have zero or more of said hints;

providing a query signature corresponding to each of a plurality of executable queries;

locating a default query if a task to be executed or a finder to be used by said task has no corresponding hints, and for locating said corresponding hints for said finder of said task otherwise;

using said located hints to select one of said queries to execute; and executing said default query or said selected query.

10. The method as claimed in claim 9, wherein each of said hints describes data to be read ahead for use by said corresponding task and wherein said each of said query signatures describes data to be retrieved by said corresponding query.

11. The method as claimed in claim 9, wherein said step of using said located hints further comprises the steps of:

comparing said located hints to said plurality of query signatures; and selecting a particular one of said queries for which said corresponding query signature matches said located hints.

12. The method as claimed in claim 11, wherein said step of selecting a particular one further comprises the step of selecting a best-matching one of said queries based on a result of said comparing step.

* * * * *